(12) United States Patent
Du et al.

(10) Patent No.: US 11,995,131 B2
(45) Date of Patent: May 28, 2024

(54) DOCUMENT MANAGEMENT PLATFORM

(71) Applicant: Capital One Services, LLC, McLean, VA (US)

(72) Inventors: Dianhai Du, Plano, TX (US); Abhinav Sharma, Flower Mound, TX (US); Billy Jack Hall, Homer, LA (US); Arvind Tangirala, Herndon, VA (US); John F. Grisamore, Wylie, TX (US); Subramanyam Jayaraman, Potomac, MD (US); Balaraju Gujjari, Little Elm, TX (US)

(73) Assignee: Capital One Services, LLC, McLean, VA (US)

( * ) Notice: Subject to any disclaimer, the term of this patent is extended or adjusted under 35 U.S.C. 154(b) by 67 days.

(21) Appl. No.: 17/302,711

(22) Filed: May 11, 2021

(65) Prior Publication Data

US 2022/0365981 A1    Nov. 17, 2022

(51) Int. Cl.
*G06F 16/93*    (2019.01)
*G06F 16/21*    (2019.01)

(52) U.S. Cl.
CPC ............ *G06F 16/93* (2019.01); *G06F 16/219* (2019.01)

(58) Field of Classification Search
CPC ................................. G06F 16/93; G06F 16/219
See application file for complete search history.

(56) References Cited

U.S. PATENT DOCUMENTS

| | | | | |
|---|---|---|---|---|
| 8,311,946 | B1* | 11/2012 | Warnock | G06F 21/6209 705/52 |
| 11,042,881 | B2* | 6/2021 | Douglas | G06Q 20/4016 |
| 2002/0114013 | A1* | 8/2002 | Hyakutake | H04N 1/32 382/100 |
| 2005/0022114 | A1* | 1/2005 | Shanahan | G06F 21/10 715/234 |
| 2007/0168350 | A1* | 7/2007 | Utiger | G06Q 10/107 |
| 2008/0104408 | A1* | 5/2008 | Mayer | H04N 1/32112 713/178 |
| 2008/0162603 | A1* | 7/2008 | Garg | G06V 30/127 |
| 2009/0089315 | A1* | 4/2009 | Jeffery | G06F 16/38 707/999.102 |
| 2010/0079781 | A1* | 4/2010 | Yamamoto | H04N 1/2179 358/1.15 |

(Continued)

*Primary Examiner* — Kris E Mackes
*Assistant Examiner* — Tiffany Thuy Bui
(74) *Attorney, Agent, or Firm* — Harrity & Harrity, LLP

(57) ABSTRACT

In some implementations, a device may receive a request for a plurality of documents that are associated with an individual or entity. The device may perform a search for the plurality of documents in one or more document repositories. The device may store, based on a determination that a first document, of the plurality of documents, is available in a document repository, of the one or more document repositories, information indicating that the first document is available in the document repository. The device may determine, based on a determination that a second document, of the plurality of documents, is not available in the one or more document repositories, a procedure that is to be used for obtaining the second document. The device may perform the procedure for obtaining the second document based on determining the procedure that is to be used for obtaining the second document.

19 Claims, 6 Drawing Sheets

(56) References Cited

U.S. PATENT DOCUMENTS

| | | | | |
|---|---|---|---|---|
| 2010/0161993 A1* | 6/2010 | Mayer | ............... | H04N 1/32112 |
| | | | | 713/178 |
| 2011/0283177 A1* | 11/2011 | Gates | .................... | G06Q 10/10 |
| | | | | 715/224 |
| 2013/0262420 A1* | 10/2013 | Edelstein | ............. | G06F 40/197 |
| | | | | 707/695 |
| 2014/0059353 A1* | 2/2014 | Picazo | ................. | H04W 4/023 |
| | | | | 713/176 |
| 2015/0150141 A1* | 5/2015 | Szymanski | ........... | G06F 40/197 |
| | | | | 726/26 |
| 2015/0220649 A1* | 8/2015 | Papa | .................... | G06F 40/166 |
| | | | | 707/722 |
| 2015/0248405 A1* | 9/2015 | Rudich | ................. | G06Q 30/04 |
| | | | | 707/608 |
| 2015/0310188 A1* | 10/2015 | Ford | ...................... | G06F 21/10 |
| | | | | 726/28 |
| 2016/0267563 A1* | 9/2016 | Follis | ................. | G06F 16/3344 |
| 2018/0121551 A1* | 5/2018 | Krasadakis | ........... | G06F 16/958 |
| 2022/0300657 A1* | 9/2022 | Tomokuni | ............. | H04L 9/3247 |

\* cited by examiner

DOCUMENT MANAGEMENT PLATFORM

BACKGROUND

A document management system is a system used to receive, track, manage, and store electronic documents. A document management system may provide history tracking such as by maintaining records of various versions of documents created and modified by different users of the document management system. A document management system may also provide indexing of documents and document retrieval functionality.

SUMMARY

In some implementations, a system for document management includes one or more memories and one or more processors, communicatively coupled to the one or more memories, configured to: receive, from an application, a request for a plurality of documents that are associated with an individual or entity; perform a search for the plurality of documents in a plurality of document repositories, wherein the plurality of document repositories store documents responsive to requests of the application and responsive to requests of at least one other application; store, based on a determination that a first document, of the plurality of documents, is available in a document repository, of the plurality of document repositories, information indicating that the first document is available in the document repository; determine, based on a determination that a second document, of the plurality of documents, is not available in the plurality of document repositories, a procedure that is to be used for obtaining the second document, wherein the procedure includes one of: transmitting, for the individual or entity, a message indicating that the second document is to be uploaded via an upload interface, or transmitting a request indicating that the second document is to be electronically signed by the individual or entity; and perform the procedure for obtaining the second document based on determining the procedure that is to be used for obtaining the second document.

In some implementations, a method for document management includes receiving, by a device from an application, a request for a plurality of documents that are associated with an individual or entity; performing, by the device, a search for the plurality of documents in one or more document repositories, wherein the one or more document repositories store documents responsive to requests of the application and responsive to requests of at least one other application; storing, by the device and based on a determination that a first document, of the plurality of documents, is available in a document repository, of the one or more document repositories, information indicating that the first document is available in the document repository; determining, by the device and based on a determination that a second document, of the plurality of documents, is not available in the one or more document repositories, a procedure that is to be used for obtaining the second document; and performing, by the device, the procedure for obtaining the second document based on determining the procedure that is to be used for obtaining the second document.

In some implementations, a non-transitory computer-readable medium storing a set of instructions for document management includes one or more instructions that, when executed by one or more processors of a device, cause the device to: receive a request for one or more documents that are associated with an individual or entity; perform a search for the one or more documents in one or more document repositories; determine, based on a determination that a document, of the one or more documents, is not available in the one or more document repositories, a procedure that is to be used for obtaining the document; and perform the procedure for obtaining the document based on determining the procedure that is to be used for obtaining the document.

DETAILED DESCRIPTION

Figure 1A:
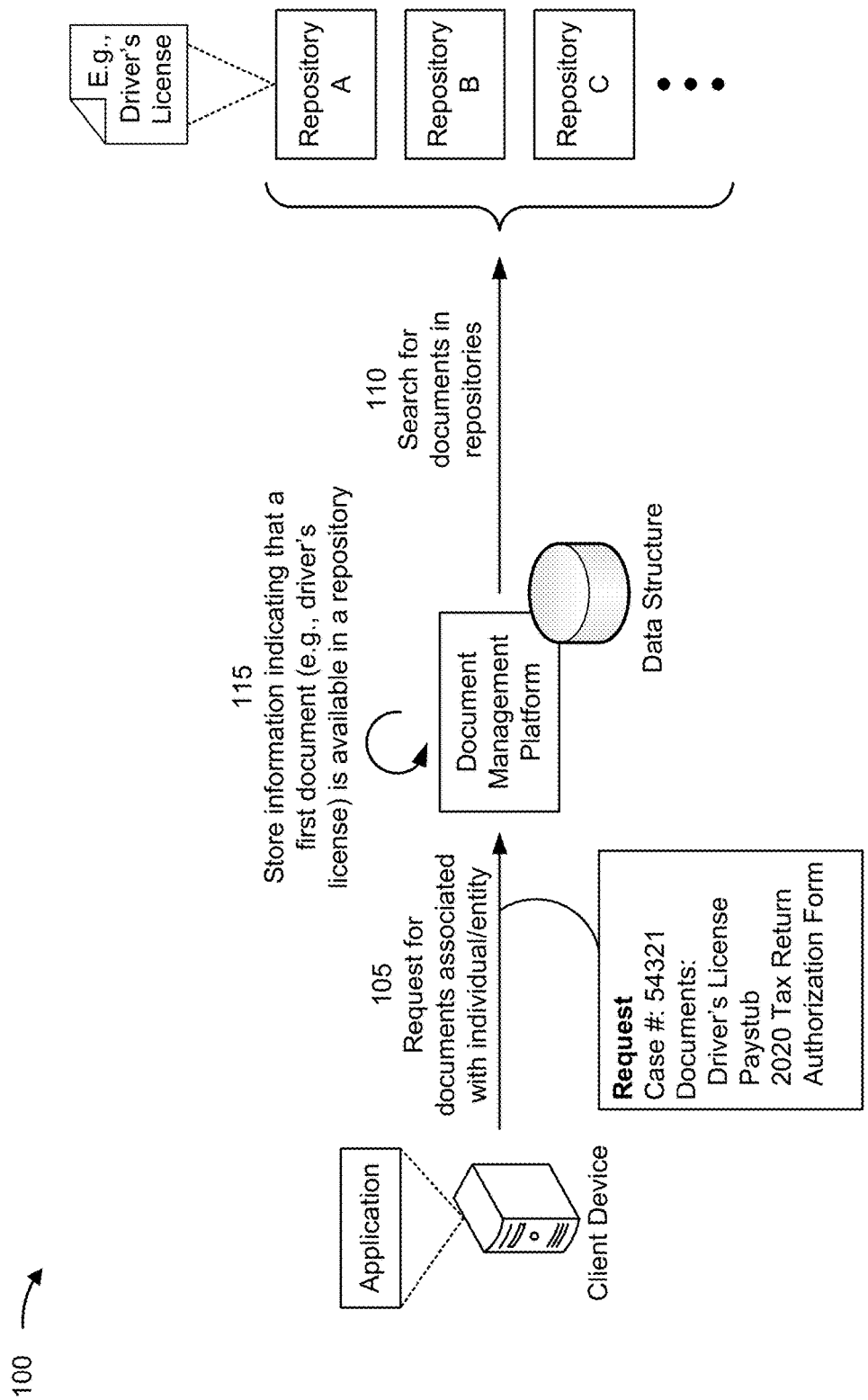
FIGS. 1A-1C are diagrams of an example implementation relating to document management.

The following detailed description of example implementations refers to the accompanying drawings. The same reference numbers in different drawings may identify the same or similar elements.

An organization (e.g., a financial institution) may be associated with multiple lines of business (e.g., lending, deposits, among other examples) and/or multiple teams of individuals (e.g., a contact center team, a banking team, an underwriting team, a loan servicing team, among other examples). Moreover, the organization may utilize various software applications to support the organization's multiple lines of business and/or multiple teams. Often, the applications may utilize document management operations, such as a document uploading operation, a document downloading operation, a document viewing operation, and/or a document listing operation. In some cases, multiple applications may utilize similar document management operations in connection with the same context (e.g., a particular loan application). For example, a loan servicing team may use an application to download and view documents associated with a loan application, and a contact center team may use a different application to download and view the same documents associated with the same loan application.

However, the multiple applications used by the organization may utilize different document management systems. For example, each application may use a document management system that is particular to the application (e.g., an application-specific document management system). Moreover, the multiple applications, using the respective document management systems, may utilize different document repositories. As a result, the document management systems used by the organization may be inefficient and perform duplicative operations, thereby consuming excessive computing resources, memory resources, or the like.

In some implementations, to solve the problems described above, as well as a technical problem of how to unify document management across multiple different software applications, a technical solution is described herein for a document management platform that is application independent and document repository independent. In some implementations, the document management platform may bridge an application (e.g., irrespective of which application) and one or more document repositories (e.g., irrespective of which document repositories). For example, the document management platform may receive a request for one or more documents from an application, and the document management platform may perform a search for the document(s) in one or more document repositories that store documents responsive to requests of multiple different applications. In some implementations, the document management platform, based on a determination that a document is not available in a document repository, may determine a procedure that is to be used for obtaining the document (e.g., based on a document type or an expected document source associated with the document), and the document management platform may perform the procedure that is determined. For example, the procedure may include transmitting a message (e.g., an email message) indicating that the document is to be uploaded via an upload interface, transmitting a request to an electronic signature service indicating that the document is to be electronically signed, or transmitting a request for the document to a document fulfillment service, among other examples.

In this way, the document management platform provides unified document management across multiple different software applications. Accordingly, multiple applications may share document management services provided by the document management platform, and a single set of document repositories may store documents that are responsive to the document requests of the multiple applications. Thus, the document management platform provides improved efficiency and reduces complexity and redundancy relative to separate application-specific document management systems, thereby conserving computing resources, memory resources, or the like. Moreover, as described above, the document management platform may autonomously determine and perform a procedure to obtain a document that is not available in a document repository. This further improves efficiency and conserves computing resources that may otherwise be used by an operator of a document management system to manually (e.g., using a computing device) determine and perform a procedure to obtain an unavailable document.

Figure 1B:
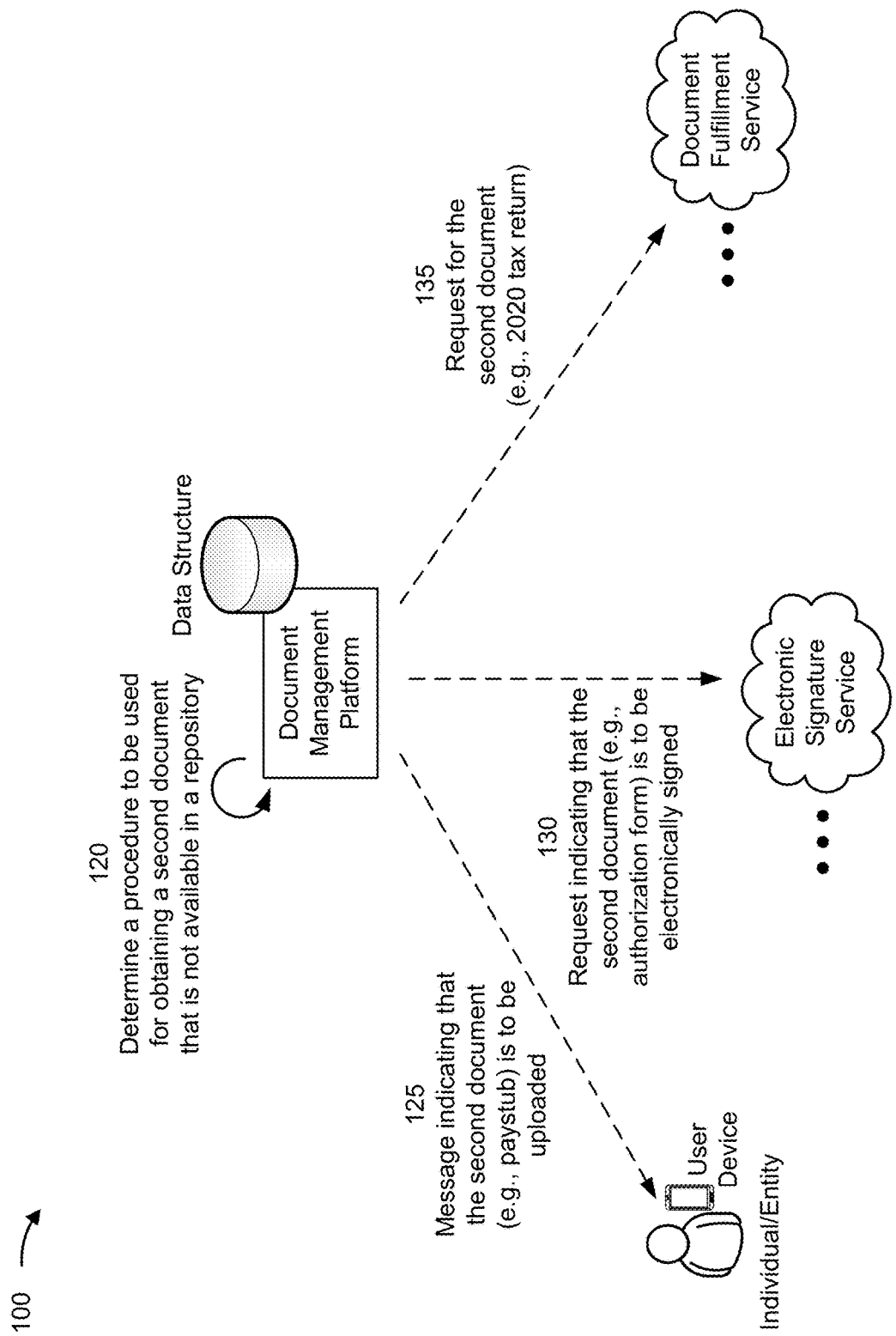
Figure 1C:
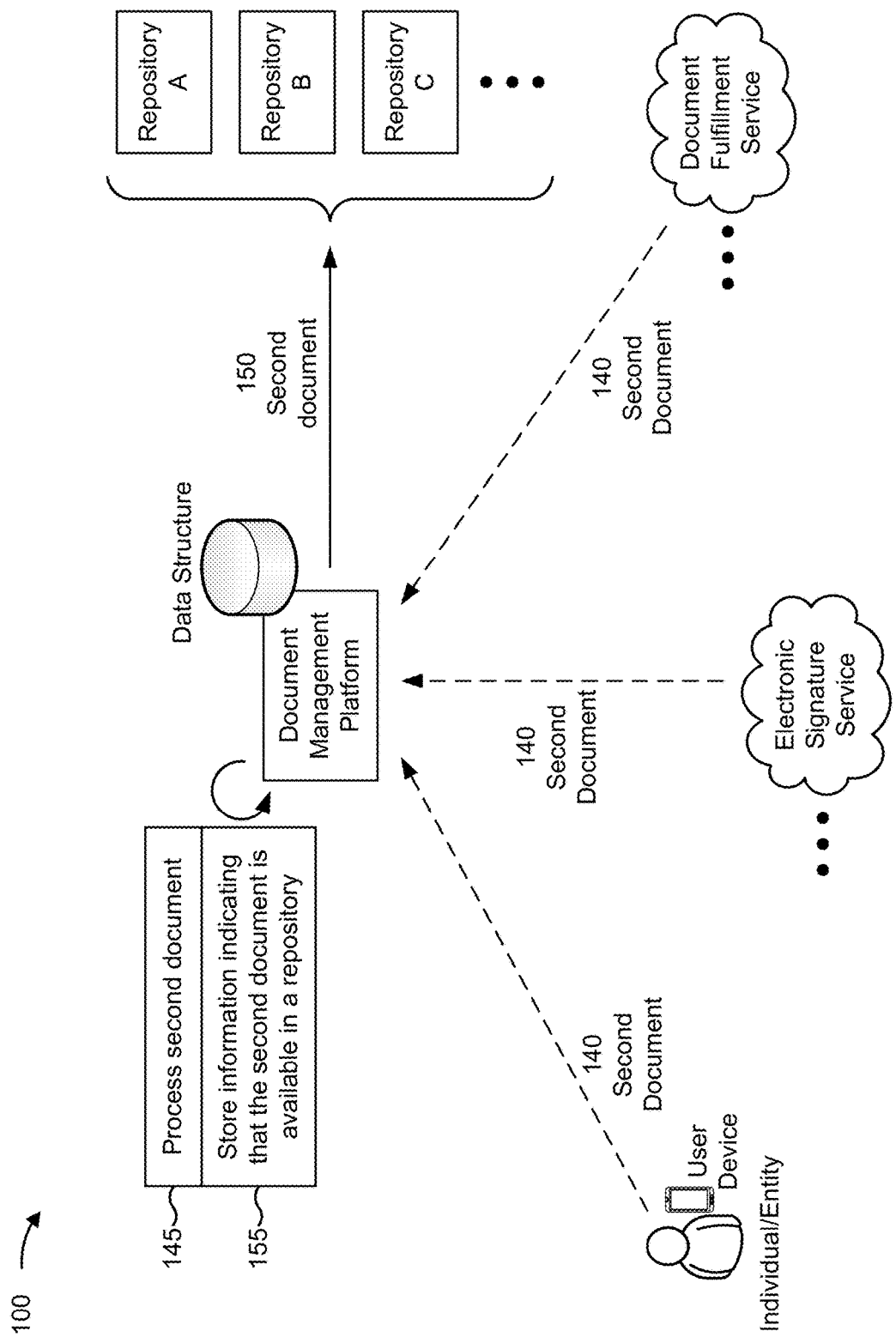

FIGS. 1A-1C are diagrams of an example 100 associated with document management. As shown in FIGS. 1A-1C, example 100 includes a document management platform (e.g., a system for document management that may be implemented by one or more server devices), one or more client devices, one or more user devices, one or more document repositories (e.g., that may be implemented by one or more repository devices), an electronic signature service (e.g., that may be implemented by one or more server devices), and a document fulfillment service (e.g., that may be implemented by one or more server devices). These devices are described in more detail in connection with FIGS. 2 and 3.

In some implementations, the document management platform may include, implement, or be communicatively connected with a data structure (e.g., a database). The data structure may store information relating to a document request, such as information relating to the requested documents, fulfillment statuses for the requested documents, fulfillment channels used to obtain the requested documents, document repository locations of the requested documents, metadata for the requested documents, or the like, as described in more detail below.

In some implementations, the document management platform may be associated with an organization, such as a financial institution, that receives, stores, and otherwise manages numerous documents associated with providing services of the organization (e.g., financial services, such as loan services, deposit services, or the like). For example, a financial institution may need to manage thousands, millions, or more documents in connection with financial services provided by the financial institution. Moreover, as described above, the organization may utilize various software applications and/or various document repositories in connection with various lines of business and/or teams of the organization.

As shown in FIG. 1A, and by reference number 105, the document management platform may receive, from an application executing on a client device, a request for one or more (e.g., a plurality of) documents. For example, the application may transmit the request for the documents based on an operator input, based on a triggering event, at a scheduled time, or the like. The documents may be associated with an individual or an entity (e.g., a customer of the financial institution). For example, the request for the documents may be in connection with a particular context (e.g., a loan application, a deposit account, or the like) that is associated with the individual or the entity. Thus, the request for the documents may identify the context, the documents being requested (e.g., document types being requested), and/or an individual or entity from which the documents are needed. In some implementations, the request for the documents may identify a line of business associated with the request, a team associated with the request, the application making the request, or the like. The request for the documents may be a new request or an update to a previous request.

In some implementations, the request for the documents may identify, for a document, a document type (e.g., driver's license, paystub, tax return, authorization form, or the like), a document sub-type, one or more document attribute variables (e.g., a year associated with the document (for example, a 2020 tax return), a government or government agency associated with the document, or the like), and/or a document source (e.g., a fulfillment channel that is to be used to obtain the document, such as the electronic signature service or the document fulfillment service). To obtain this information for the request, the application may query a taxonomy module of the document management platform. For example, the taxonomy module may maintain, for a particular context, a list of documents that are needed, and for each document may identify a document type, a document sub-type, one or more lines of business, one or more categories, one or more document attribute variables, a document source, and/or one or more required properties of the document, among other examples. In some implementations, the request for documents may omit particular information, and the document management platform may obtain the omitted information from the taxonomy module.

The document management platform may receive the request for documents from the application via an application programming interface (API). For example, the document management platform may include a document request module that handles incoming requests for documents. The document request module also may provide (e.g., to the application) a fulfillment status for a previous request for documents, may receive (e.g., from another module of the document management platform) an update to the fulfillment status, and/or may provide (e.g., to the application) a notification indicating the update to the fulfillment status. In some implementations, the request for documents may be handled by the document management platform in connection with batch processing or stream processing performed by the document management platform.

The document management platform may store information relating to the request for documents, received from the application, in the data structure. For example, the information may identify, for the request for documents, the context, the individual or entity, the document types, the document attribute variables, and/or the document sources, among other examples.

The document management platform may monitor the data structure to detect new requests for documents. For example, a document request manager module of the document management platform may monitor the data structure to detect new requests for documents. Upon receiving/detecting the request for documents from the application, the document management platform may perform one or more operations to fulfill the request for documents, as described in more detail below.

As shown by reference number 110, the document management platform may perform a search for the documents requested in one or more (e.g., a plurality of) document repositories. That is, the document management platform may perform a search in the document repositories to determine whether documents, in accordance with the request and associated with the individual or entity, are available. To perform the search, the document management platform (e.g., the document request manager module) may query a document search module of the document management platform. For example, the document search module may maintain an index of documents stored in the document repositories. The index may identify, for a document, a document repository location, metadata associated with the document, keywords associated with the document (e.g., based on an indexing of the document performed by the document management platform), or the like.

In some implementations, the document management platform may perform the search for the documents based on metadata. For example, metadata for a document may identify a document type, one or more document attribute variables, an individual or entity associated with the document, or the like. Additionally, or alternatively, the document management platform may perform the search for the documents based on keywords. Additionally, or alternatively, the document management platform may perform the search for the documents using a machine learning model trained to determine a likelihood of whether a document in a document repository is a document that is requested.

The document repositories may be independent of the application requesting the documents. For example, the document repositories may store documents responsive to requests of the application and responsive to requests of at least one other application. In other words, documents stored by the document repositories may be for non-exclusive use by the application. As an example, a document stored in a document repository may fulfill a first request of a first application, and the same document may fulfill a second request of a second application. In some implementations, the document repositories may include one or more private document repositories (e.g., of the organization) and/or one or more public document repositories (e.g., document repositories available to the general public). In some implementations, the document management platform may communicate with the document repositories via a single point of integration (e.g., a single API). For example, the document management platform may make a single API request to a repository integration module of the document management platform. The repository integration module may generate respective API requests for the multiple document repositories based on the single API request. Moreover, the repository integration module may receive respective API responses from the document repositories, and the repository integration module may generate a single API response based on the respective API responses. In this way, document repositories used by the document management platform can be added or deleted with minimal interruption to the document management platform.

The document management platform may determine that one or more of the requested documents are available in one or more of the document repositories. For example, the document management platform may determine that a first document (e.g., a driver's license) of the requested documents is available in a document repository (e.g., Repository A). In some implementations, based on determining that the first document is available, the document management platform (e.g., using the document search module) may obtain information relating to a content of the first document (e.g., text, or other data, extracted from the first document). In some examples, the document management platform may determine that one or more of the requested documents are not available in the document repositories. For example, the document management platform may determine that a second document (e.g., a paystub, a tax return, or an authorization form) is not available in the document repositories.

As shown by reference number 115, based on determining that the first document is available, the document management platform may store (e.g., in the data structure) information indicating that the first document is available in the document repository. For example, the document management platform may update (e.g., in the data structure) a fulfillment status for the first document to indicate that the first document is available in the document repository. As another example, the document management platform may update metadata associated with the first document in the document repository (e.g., to indicate that the first document is associated with the context of the request for documents). In some implementations, the document management platform may provide a notification to the application indicating that the first document is available in the document repository and/or indicating that the second document is not available in the document repositories. In some implementations, the document management platform may provide the first document, provide a link to the first document, provide information relating to a content of the first document, or the like, to the application.

As shown in FIG. 1B, and by reference number 120, based on determining that the second document is not available in the document repositories, the document management platform (e.g., the document request manager module) may determine a procedure that is to be used for obtaining the second document. The document management platform may determine the procedure based on a document type, a document source, and/or one or more document attribute variables associated with the second document. For example, a particular document type may indicate a particular fulfillment channel that is to be used to obtain the second document, and the document management platform may determine the procedure based on the particular fulfillment channel that is to be used. As another example, a document source may identify a particular fulfillment channel that is to be used to obtain the second document, and the document management platform may determine the procedure based on the particular fulfillment channel that is to be used. In some implementations, the document management platform may determine the procedure using a machine learning model trained to determine a procedure for obtaining a document (e.g., based on a document type, a document source, and/or one or more document attribute variables).

The procedure determined by the document management platform may be a first procedure that includes transmitting a message (e.g., an email), for the individual or entity, indicating that the second document is to be uploaded via an upload interface. For example, the document management platform may determine to use the first procedure based on a determination that the fulfillment channel for the second document is the upload interface.

The procedure determined by the document management platform may be a second procedure that includes transmitting, to the electronic signature service, a request indicating that the second document is to be electronically signed by the individual or entity. For example, the document management platform may determine to use the second procedure based on a determination that the fulfillment channel for the second document is the electronic signature service. The request transmitted to the electronic signature service may cause the electronic signature service to transmit a message (e.g., an email) to the individual or entity indicating that the second document is to be electronically signed via the electronic signature service.

The procedure determined by the document management platform may be a third procedure that includes transmitting, to the document fulfillment service, a request for the second document. For example, the document management platform may determine to use the third procedure based on a determination that the fulfillment channel for the second document is the document fulfillment service. The document fulfillment service may be a third-party service, external to the document management platform, that provides document fulfillment, such as a service offered by the Internal Revenue Service or a state tax department for downloading tax returns or forms, a service offered by a professional association for downloading member records, etc. In some implementations, the document management platform may determine the document fulfillment service that is to be used for the third procedure. For example, the document management platform may determine the document fulfillment service that is to be used based on a document type, a document source, and/or one or more document attribute variables associated with the second document. As an example, if the second document is a state tax return, the document management platform may determine that the document fulfillment service that is to be used is a service offered by the state tax department.

In some implementations, the procedure determined by the document management platform may be a procedure other than the first procedure, the second procedure, and the third procedure described above. As described below, the document management platform may perform the procedure for obtaining the second document. That is, the document management platform may perform the procedure for obtaining the second document based on determining the procedure that is to be used for obtaining the second document.

As shown by reference number 125, in some implementations, the document management platform may perform (e.g., using a document upload module of the document management platform) the first procedure by transmitting, to a user device of the individual or entity, the message (e.g., for the individual or entity) indicating that the second document (e.g., a paystub) is to be uploaded via the upload interface. The message may include a link to the upload interface.

As shown by reference number 130, in some implementations, the document management platform may perform (e.g., using an electronic signature module of the document management platform) the second procedure by transmitting, to the electronic signature service, the request indicating that the second document (e.g., an authorization form) is to be electronically signed by the individual or entity. The document management platform may transmit the second document (e.g., an unfilled/unsigned copy of the second document) with the request (e.g., the request may include the second document). In some implementations, the document management platform, using the electronic signature module, may communicate with multiple electronic signature services via a single point of integration (e.g., a single API), in a similar manner as described above for communicating with multiple document repositories.

As shown by reference number 135, in some implementations, the document management platform may perform (e.g., using a document fulfillment module of the document management platform) the third procedure by transmitting, to the document fulfillment service (e.g., the document fulfillment service determined by the document management platform), the request for the second document. The request may cause the document fulfillment service to obtain the second document (e.g., from a document repository that is not accessible to the document management platform). The request for the second document may include one or more parameters, such as a document type (e.g., a tax return) and/or one or more document attribute variables (e.g., a year, such as a 2020 tax return). The request for the second document may include information (e.g., a consent document) indicating that the document management platform is authorized by the individual or entity to obtain the second document from the document fulfillment service. In some implementations, the document management platform, when performing the third procedure, may transmit a request for consent to the user device of the individual or entity, and receive the information (e.g., the consent document) from the user device in response to the request. In some implementations, the document management platform, using the document fulfillment module, may communicate with multiple document fulfillment services via a single point of integration (e.g., a single API), in a similar manner as described above for communicating with multiple document repositories.

As shown in FIG. 1C, and by reference number 140, the document management platform may obtain the second document. In connection with the first procedure, the document management platform may obtain, via the upload interface, the second document (e.g., a paystub). For example, the individual or entity may upload the second document using the upload interface. In some implementations, the document management platform, or another platform or device, may authenticate the individual or entity prior to permitting the individual or entity to upload the second document via the upload interface. In some implementations, the document management platform may cause information (e.g., obtained from the data structure) relating to the second document (as well as any other documents that are to be uploaded) to be displayed in the upload interface.

In connection with the second procedure, the document management platform may receive, from the electronic signature service and in response to the request indicating that the second document is to be electronically signed, an indication that the second document has been electronically signed (e.g., the individual or entity electronically signed the second document via the electronic signature service). In some implementations, the indication is an email, and the document management platform may process (e.g., parse) the email to identify the second document, the individual or entity associated with the second document, the context associated with the second document, or the like. Based on the indication, the document management platform may obtain the second document (e.g., an authorization form), which has been electronically signed, from the electronic signature service. For example, the document management platform may transmit a request (e.g., via an API) for the second document to the electronic signature service, and the document management platform may receive, in response to the request, the second document. In some implementations, the document management platform may obtain the second document from the electronic signature service without receiving the indication that the second document has been electronically signed. For example, the document management platform may transmit the request for the second document to the electronic signature service based on detecting another triggering event (e.g., receiving a query from the application regarding the fulfillment status for the request for documents), at a scheduled time, or the like.

In connection with the third procedure, the document management platform may obtain, from the document fulfillment service (e.g., a third-party service external to the document management platform) and in response to the request for the second document, the second document (e.g., a tax return). For example, the document management platform may receive an email from the document fulfillment service that includes the second document. Here, the document management platform may process the email to identify the second document, the individual or entity associated with the second document, the context associated with the second document, or the like, in a similar manner as described above. As another example, the document management platform may receive, from the document fulfillment service, a link to the second document, and the document management platform may obtain the second document via the link.

As shown by reference number 145, the document management platform may process the second document. For example, a document ingestion module of the document management platform may process the second document. The document management platform may process the second document that is obtained by the first procedure, the second procedure, or the third procedure. In some implementations, the first procedure, the second procedure, or the third procedure may include the processing of the second document. In some implementations, the document management platform, to process the second document, may perform a virus scan of the second document.

In some implementations, the document management platform, to process the second document, may perform optical character recognition (OCR) on the second document. For example, an OCR module of the document management platform may perform OCR on the second document. Based on performing OCR on the second document, the document management platform may extract text data from the second document. The document management platform may store the extracted text (e.g., in the data structure), generate and store metadata for the second document based on the extracted text (e.g., metadata relating to a document type of the second document, individuals and/or entities associated with the second document, document attribute variables associated with the second document, or the like), perform (e.g., using the document search module) indexing of the second document based on the extracted text, determine a document type of the second document based on the extracted text, or the like. In some implementations, the document management platform may process the extracted text using a decision engine, using spread analysis, or the like (e.g., to determine a classification of the second document, to determine one or more actions that are to be performed based on obtaining the second document, or the like).

Additionally, or alternatively, to process the second document, the document management platform may perform verification of the second document. For example, the document management platform may perform verification of the second document based on performing OCR on the second document (e.g., based on the extracted text). Moreover, the document management platform may perform verification of the second document by determining whether information contained in the second document corresponds to information in the request for documents (e.g., whether the second document that was obtained corresponds to the second document that was expected). In some implementations, the document management platform may determine a document type for the second document that was obtained and determine whether the document type corresponds to a document type that is associated with (e.g., that was expected for) the second document (e.g., based on the request for documents). Moreover, the document management platform may determine whether a name of the individual or entity associated with the second document, and/or one or more document attribute variables associated with the second document (e.g., a particular year), appears in the second document that was obtained. In some implementations, the document management platform may perform verification of the second document using a machine learning model trained to determine a classification for a document. If verification of the second document fails, the document management platform may transmit (e.g., to the user device of the individual or entity) a notification indicating the failure of the verification, cause the notification to be displayed in the upload interface, or the like.

Additionally, or alternatively, to process the second document, the document management platform may use a verification service to perform verification of the second document. For example, the document management platform may determine information (e.g., a document type and/or one or more document attribute variables) relating to the second document (e.g., based on the extracted text), as described above, and the document management platform may determine a verification service that is to be used for verification of the second document based on the information (e.g., a verification service that is to be used for verifying the document type). As an example, the document management platform may determine that a verification service offered by a state's department of motor vehicles is to be used for verification of a driver's license for the state. Based on determining the verification service, the document management platform may perform, using the verification service, verification of the second document. For example, the document management platform may transmit a verification request that includes the second document to the verification service, and the document management platform may receive a verification response from the verification service that indicates whether verification of the second document was successful. If verification of the second document fails, the document management platform may transmit a notification indicating the failure of the verification or cause the notification to be displayed in the upload interface, in a similar manner as described above.

In some implementations, a document verification module of the document management platform may perform verification of the second document using the verification service. The document verification module may maintain a registry that identifies verification services (e.g., API endpoints for the verification services) and document types that can be verified by the verification services. Moreover, the document verification module may perform verification service discovery operations to identify verification services that can be used by the document management platform. For example, the document verification module may perform web crawling to identify the verification services.

As shown by reference number 150, the document management platform may cause the second document to be stored to one or more of the document repositories. For example, the document management platform may cause the second document to be stored to a document repository based on successful verification of the second document. In some implementations, the second document may be stored to the document repository in association with metadata generated for the second document. In some implementations, the first procedure, the second procedure, or the third procedure may include causing the second document to be stored to the document repository.

As shown by reference number 155, based on obtaining and storing the second document, the document management platform may store (e.g., in the data structure) information indicating that the second document is available in the document repository. For example, the document management platform may update (e.g., in the data structure) a fulfillment status for the second document to indicate that the second document is available in the document repository. In some implementations, the document management platform may provide a notification to the application indicating that the second document is available in the document repository, in a similar manner as described above. In some implementations, the document management platform may provide the second document, provide a link to the second document, provide information relating to a content of the second document, or the like, to the application, in a similar manner as described above. In some implementations, the first procedure, the second procedure, or the third procedure may include storing the information.

In some implementations, the document management platform (e.g., the document request manager module) may monitor the data structure for stale requests for documents (e.g., wholly or partially unfulfilled requests that were made prior to a threshold time). Based on a determination that a document of a stale request has not been fulfilled, the document management platform (e.g., the document request manager module) may perform one or more fulfillment operations. For example, the document management platform may perform another search for the document in the document repositories. As another example, the document management platform may transmit a reminder message regarding a previously transmitted message of the first procedure, request of the second procedure, or request of the third procedure. As a further example, the document management platform may retransmit the message of the first procedure, the request of the second procedure, or the request of the third procedure. In some implementations, the document management platform may continue to perform searches, transmit reminder messages, and/or perform retransmissions until all documents of a request for documents have been fulfilled (or an exception for a missing document has been raised).

As described above, the document management platform may fulfill requests for documents independent of the requesting application. For example, after receiving the request for documents from the application, the document management platform may receive, from another application executing on the client device or another client device, a request for one or more (e.g., a plurality of) different documents (or one or more of the same documents), in a similar manner as described above. The application and the other application may be used by different lines of business of the organization and/or by different teams of the organization. Based on receiving the request, the document management platform may perform another search for the different documents in the document repositories (e.g., the same document repositories in which the documents of the initial request were searched), in a similar manner as described above. Moreover, based on a determination that a document is not available in the document repositories, the document management platform may determine and perform a procedure for obtaining the document, in a similar manner as described above.

In this way, the document management platform provides unified document management across multiple different software applications and multiple different document repositories used by an organization. Thus, the document management platform provides improved efficiency and reduces complexity and redundancy in connection with document management, thereby conserving computing resources, memory resources, or the like.

As indicated above, FIGS. 1A-1C are provided as an example. Other examples may differ from what is described with regard to FIGS. 1A-1C.

Figure 2:
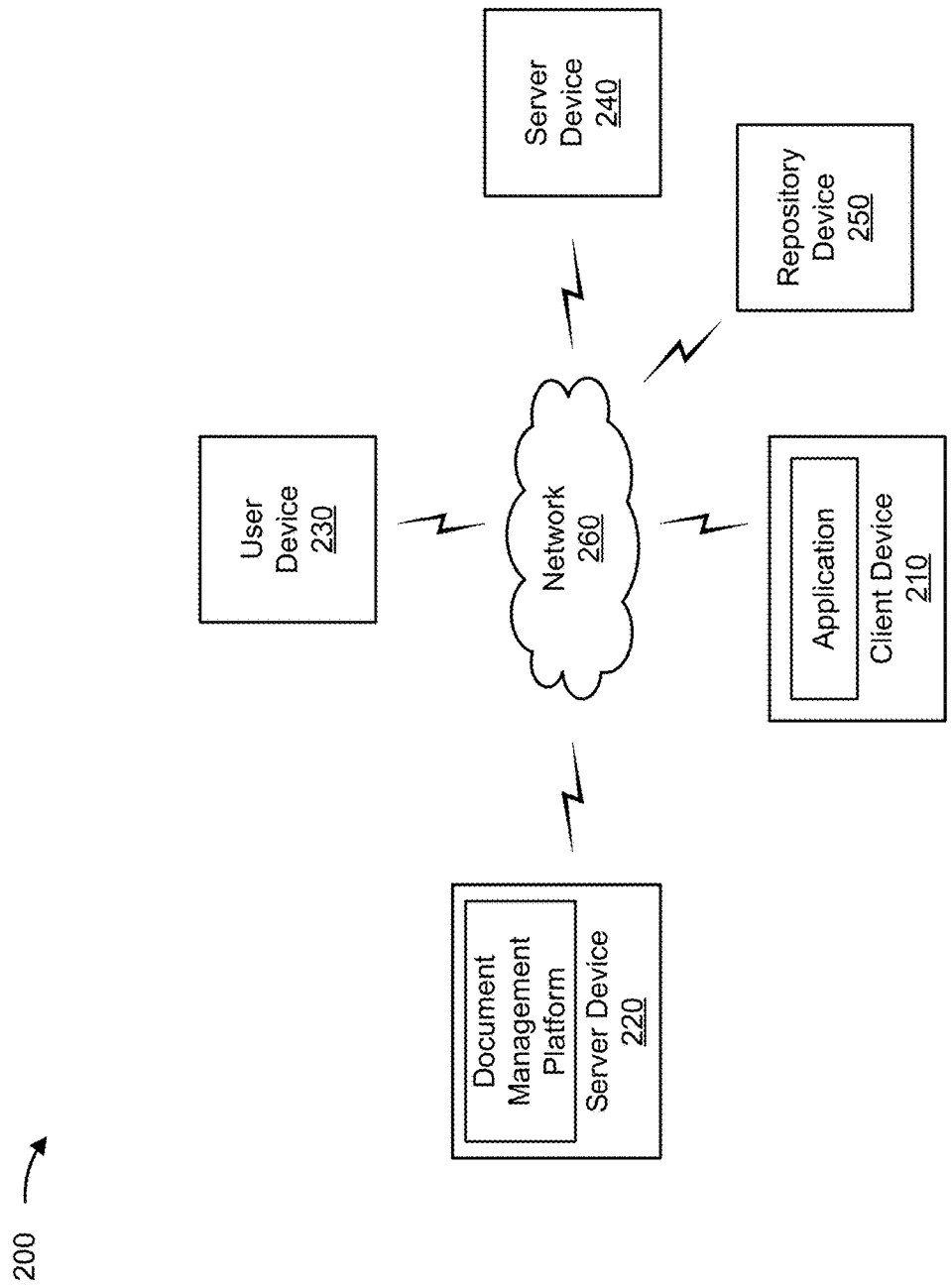
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, a user device 230, a server device 240, a repository device 250, and a network 260. Devices of environment 200 may interconnect via wired connections, wireless connections, or a combination of wired and wireless connections.

The client device 210 includes one or more devices capable of receiving, generating, storing, processing, and/or providing information associated with document management, as described elsewhere herein. For example, the client device 210 may transmit a request for documents, or the like, as described elsewhere herein. The client device 210 may implement an application (e.g., a loan origination application) for which the documents are requested. The client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The server device 220 includes one or more devices capable of receiving, generating, storing, processing, providing, and/or routing information associated with document management, as described elsewhere herein. For example, the server device 220 may receive a request for documents, perform a search for documents in one or more document repositories, determine a procedure for obtaining a document that is not available in a document repository, perform the procedure, or the like, as described elsewhere herein. The server device 220 may implement the document management platform, as described elsewhere herein. The server device 220 may include a communication device and/or a computing device. For example, the server device 220 may include a server, such as an application server, a client server, a web server, a database server, a host server, a proxy server, a virtual server (e.g., executing on computing hardware), or a server in a cloud computing system. In some implementations, the server device 220 includes computing hardware used in a cloud computing environment.

The user device 230 includes one or more devices capable of receiving, generating, storing, processing, and/or providing information associated with a document upload, as described elsewhere herein. For example, the user device 230 may receive a message indicating that a document is to be uploaded, upload a document, or the like, as described elsewhere herein. The user device 230 may be associated with an individual or entity associated with a request for documents, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 240 includes one or more devices capable of receiving, generating, storing, processing, providing, and/or routing information associated with electronic signing of documents and/or document fulfillment. For example, the server device 240 may receive a request indicating that a document is to be electronically signed, transmit a message indicating that the document is to be electronically signed, provide a user interface for electronic signing, transmit an indication that the document has been electronically signed, provide the document that has been electronically signed, or the like, as described elsewhere herein. As another example, the server device 240 may receive a request for a document, obtain the document, provide the document, or the like, as described elsewhere herein. The server device 240 may implement the electronic signature service and/or the document fulfillment service, as described elsewhere herein. The server device 240 may include a communication device and/or a computing device. For example, the server device 240 may include a server, such as an application server, a client server, a web server, a database server, a host server, a proxy server, a virtual server (e.g., executing on computing hardware), or a server in a cloud computing system. In some implementations, the server device 240 includes computing hardware used in a cloud computing environment.

The repository device 250 includes one or more devices capable of receiving, storing, processing, and/or providing documents, as described elsewhere herein. For example, the repository device 250 may implement one or more document repositories, as described elsewhere herein. The repository device 250 may include a communication device and/or a computing device. For example, the repository device 250 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
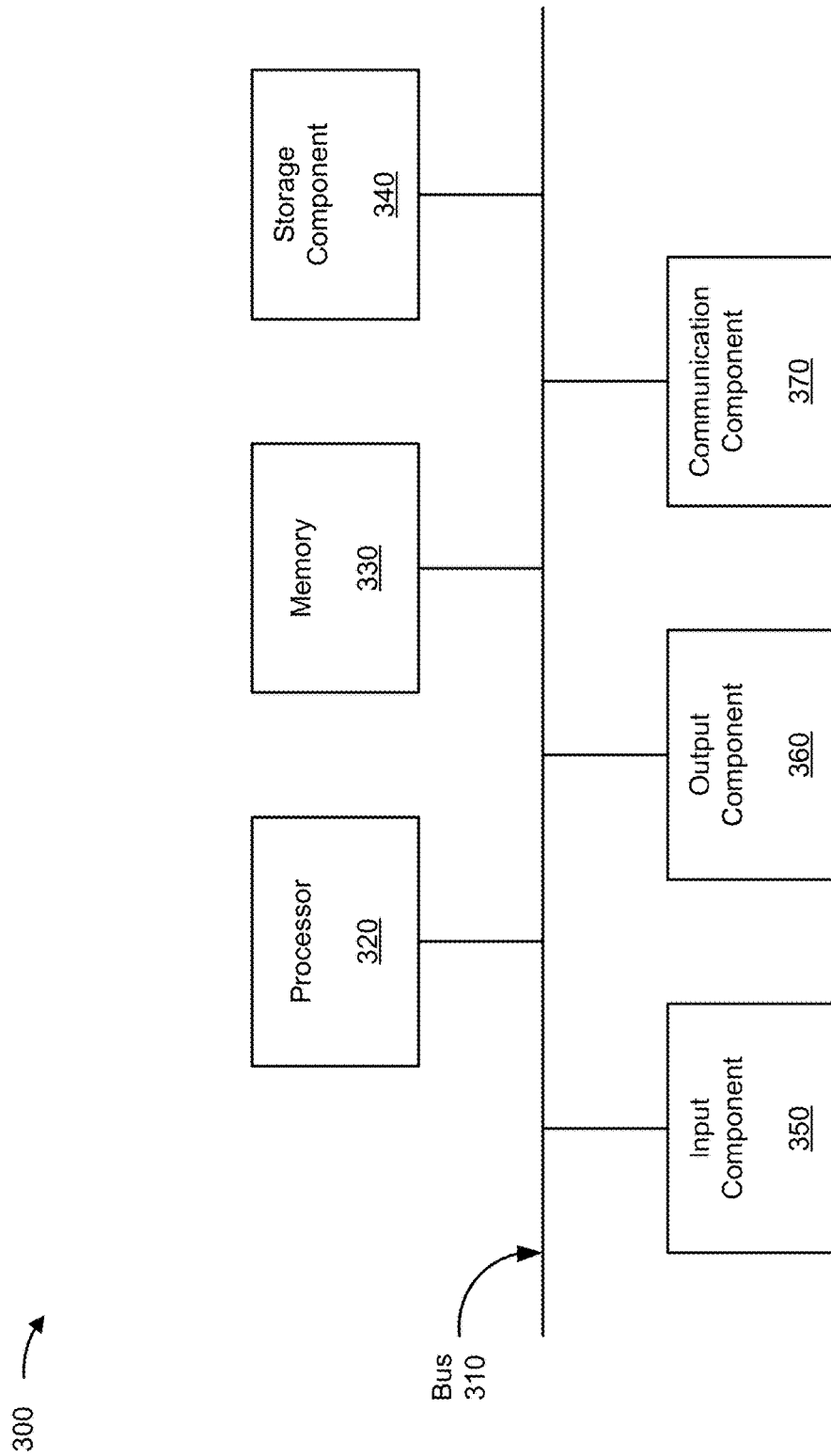
FIG. 3 is a diagram of example components of one or more devices of FIG. 2.

FIG. 3 is a diagram of example components of a device 300, which may correspond to client device 210, server device 220, user device 230, server device 240, and/or repository device 250. In some implementations, client device 210, server device 220, user device 230, server device 240, and/or repository device 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The quantity and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
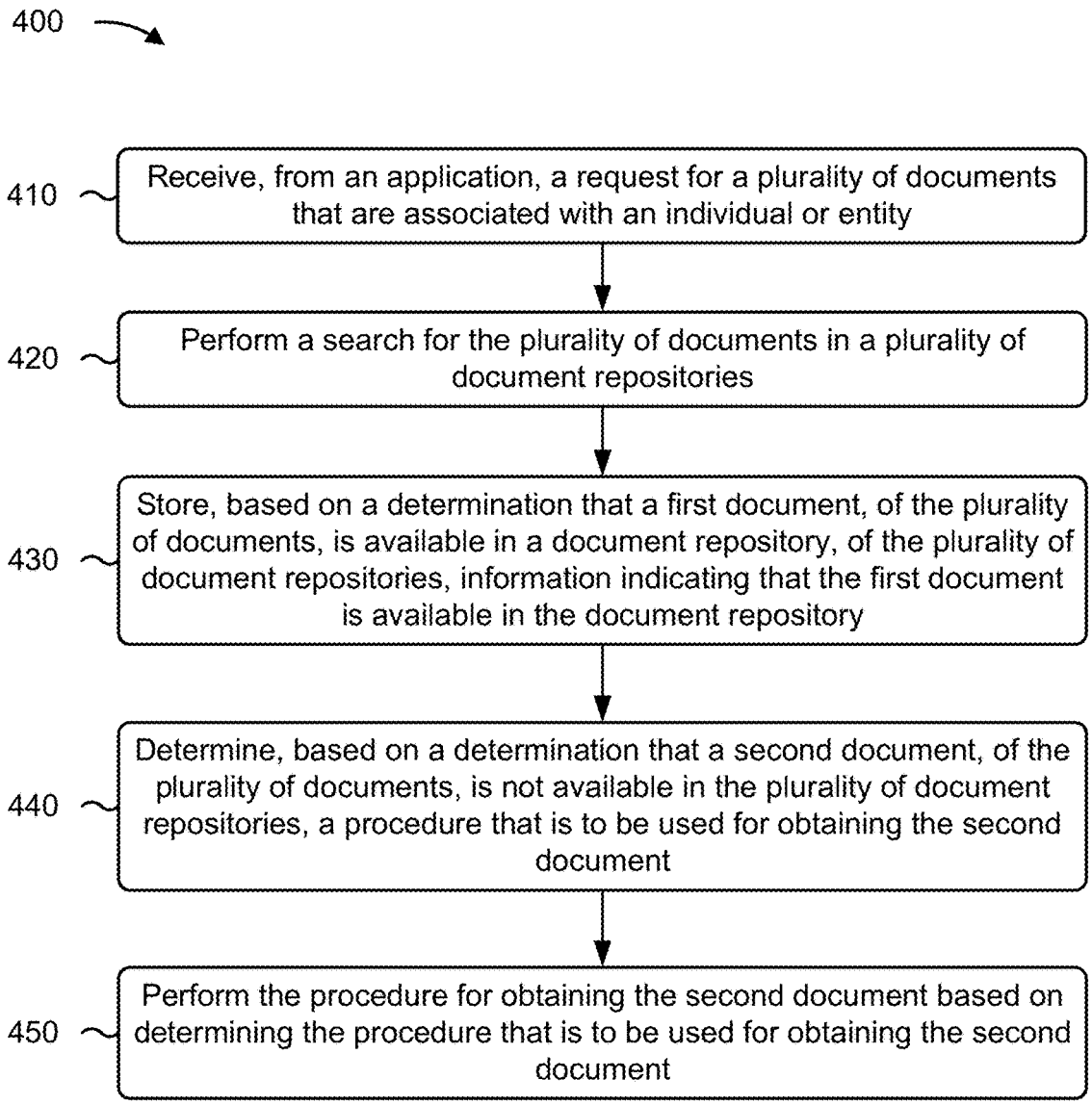
FIG. 4 is a flowchart of an example process relating to document management.

FIG. 4 is a flowchart of an example process 400 associated with document management. In some implementations, one or more process blocks of FIG. 4 may be performed by a device (e.g., server device 220). In some implementations, one or more process blocks of FIG. 4 may be performed by another device or a group of devices separate from or including the device, such as client device 210, user device 230, server device 240, and/or repository device 250. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from an application, a request for a plurality of documents that are associated with an individual or entity (block 410). As further shown in FIG. 4, process 400 may include performing a search for the plurality of documents in a plurality of document repositories (block 420). In some implementations, the plurality of document repositories store documents responsive to requests of the application and responsive to requests of at least one other application. As further shown in FIG. 4, process 400 may include storing, based on a determination that a first document, of the plurality of documents, is available in a document repository, of the plurality of document repositories, information indicating that the first document is available in the document repository (block 430). As further shown in FIG. 4, process 400 may include determining, based on a determination that a second document, of the plurality of documents, is not available in the plurality of document repositories, a procedure that is to be used for obtaining the second document (block 440). In some implementations, the procedure includes one of: transmitting, for the individual or entity, a message indicating that the second document is to be uploaded via an upload interface; transmitting a request indicating that the second document is to be electronically signed by the individual or entity; or transmitting a request for the second document. As further shown in FIG. 4, process 400 may include performing the procedure for obtaining the second document based on determining the procedure that is to be used for obtaining the second document (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Accordingly, the scope of the invention should be determined not by the embodiments illustrated, but by the appended claims and their equivalents.

What is claimed is:

1. A system for document management, the system comprising:
   one or more memories; and
   one or more processors, communicatively coupled to the one or more memories, configured to:

receive, from an application, a request for a plurality of documents that are associated with an individual or entity,
    wherein the request for the plurality of documents identifies for a document, of the plurality of documents, a document source that is a fulfillment channel to obtain the document;
perform a search for the plurality of documents in a plurality of document repositories based on metadata,
    wherein metadata includes one or more of:
        a document type, or
        one or more document attribute variables,
    wherein the plurality of document repositories store documents responsive to requests of the application and responsive to requests of at least one other application, and
    wherein the plurality of document repositories are independent of the application requesting the documents;
store, based on a determination that a first document, of the plurality of documents, is available in a document repository, of the plurality of document repositories, information indicating that the first document is available in the document repository;
determine, based on a determination that a second document associated with the first document, of the plurality of documents, is not available in the plurality of document repositories, a procedure that is to be used for obtaining the second document, wherein the procedure includes:
    transmitting a request to upload the second document, and
    transmitting a request indicating that the second document is to be electronically signed by the individual or entity;
obtain, after transmitting the request, the second document that has been electronically signed; and
store information indicating that the second document is available in one of the plurality of document repositories.

2. The system of claim 1, wherein the procedure is determined based on at least one of a document type associated with the second document or a document source associated with the second document.

3. The system of claim 1, wherein the request for the plurality of documents identifies for a document, of the plurality of documents, at least one of the document type, or the one or more document attribute variables.

4. The system of claim 1, wherein the one or more processors are further configured to:
    transmit, for the individual or entity, a message indicating that a third document is to be uploaded via an upload interface;
    obtain, via the upload interface, the third document;
    cause the third document to be stored to one of the plurality of document repositories; and
    store information indicating that the third document is available in the one of the plurality of document repositories.

5. The system of claim 1, wherein the request indicating that the second document is to be electronically signed by the individual or entity is transmitted to an electronic signature service.

6. The system of claim 1, wherein the one or more processors are further configured to:
    receive, in response to the request indicating that the second document is to be electronically signed by the individual or entity, an indication that the second document has been electronically signed.

7. The system of claim 1, wherein the one or more processors are further configured to:
    receive, from the at least one other application, a request for a different plurality of documents; and
    perform another search for the different plurality of documents in the plurality of document repositories.

8. A method for document management, comprising:
    receiving, by a device from an application, a request for a plurality of documents that are associated with an individual or entity,
        wherein the request for the plurality of documents identifies for a document, of the plurality of documents, a document source that is a fulfillment channel to obtain the document;
    performing, by the device, a search for the plurality of documents in a plurality of document repositories based on metadata,
        wherein metadata includes one or more of:
            a document type, or
            one or more document attribute variables,
        wherein the plurality of document repositories store documents responsive to requests of the application and responsive to requests of at least one other application, and
        wherein the plurality of document repositories are independent of the application requesting the documents;
    storing, by the device and based on a determination that a first document, of the plurality of documents, is available in a document repository, of the plurality of document repositories, information indicating that the first document is available in the document repository;
    determining, by the device and based on a determination that a second document associated with the first document, of the plurality of documents, is not available in the plurality of document repositories, a procedure that is to be used for obtaining the second document,
        wherein the procedure includes:
            transmitting a request to upload the second document, and
            transmitting a request indicating that the second document is to be electronically signed by the individual or entity;
    obtaining, by the device and after transmitting the request, the second document that has been electronically signed; and
    storing, by the device, information indicating that the second document is available in the one of the plurality of document repositories.

9. The method of claim 8, wherein the procedure includes one of:
    transmitting, for the individual or entity, a message indicating that a third document is to be uploaded via an upload interface; or
    transmitting, to a document fulfillment service, a request for the third document.

10. The method of claim 8, further comprising:
    transmitting, for the individual or entity, a message indicating that a third document is to be uploaded via an upload interface;
    obtaining, via the upload interface, the third document;
    causing the third document to be stored to one of the plurality of document repositories; and storing information indicating that the third document is available in the one of the plurality of document repositories.

11. The method of claim 8, further comprising:

receiving, in response to the request indicating that the second document is to be electronically signed by the individual or entity, an indication that the second document has been electronically signed; and causing the second document that has been electronically signed to be stored to one of the plurality of document repositories.

12. The method of claim 8, further comprises:

transmitting, to a document fulfillment service, a request for a third document;

receiving, in response to the request for the second document, the third document;

causing the third document to be stored to one of the plurality of document repositories; and storing information indicating that the second document is available in the one of the plurality of document repositories.

13. The method of claim 8, wherein the documents stored by the plurality of document repositories are for non-exclusive use by the application.

14. The method of claim 8, further comprising:

receiving, from the at least one other application, a request for a different plurality of documents; and performing another search for the different plurality of documents in the plurality of document repositories.

15. A non-transitory computer-readable medium storing a set of instructions for document management, the set of instructions comprising:

one or more instructions that, when executed by one or more processors of a device, cause the device to:

receive a request for one or more documents that are associated with an individual or entity, wherein the request for the one or more documents identifies for a document, of the one or more documents, a document source that is a fulfillment channel to obtain the document;

perform a search for the one or more documents in a plurality of document repositories based on metadata, wherein metadata includes one or more of:

a document type, or one or more document attribute variables, and wherein the plurality of document repositories are independent of the request for the one or more documents;

determine, based on a determination that a document, of the one or more documents, is not available in the plurality of document repositories, a procedure that is to be used for obtaining the document, wherein the procedure includes:

transmitting a request to upload the document, and transmitting another request indicating that the document is to be electronically signed by the individual or entity;

obtain, after transmitting the request, the document that has been electronically signed; and store information indicating that the document is available in one of the plurality of document repositories.

16. The non-transitory computer-readable medium of claim 15, wherein the request is received via an application programming interface.

17. The non-transitory computer-readable medium of claim 15, wherein the one or more instructions that further cause the device to:

transmit, for the individual or entity, a message indicating that another document is to be uploaded via an upload interface;

obtain, via the upload interface, the other document;

perform processing of the other document;

cause the other document to be stored to one of the plurality of document repositories; and store information indicating that the other document is available in the one of the plurality of document repositories.

18. The non-transitory computer-readable medium of claim 17, wherein the one or more instructions that further cause the device to:

perform optical character recognition (OCR) on a third document; and perform verification of the document based on performing the OCR on the other document.

19. The non-transitory computer-readable medium of claim 17, wherein the one or more instructions, that cause the device to perform processing of the document, cause the device to:

determine the document type of the document;

determine a verification service used for the document type of the document; and perform, using the verification service, verification of the document.

* * * * *